Feb. 10, 1953   P. F. FREEMAN, JR., ET AL   2,627,714
HAY BALER

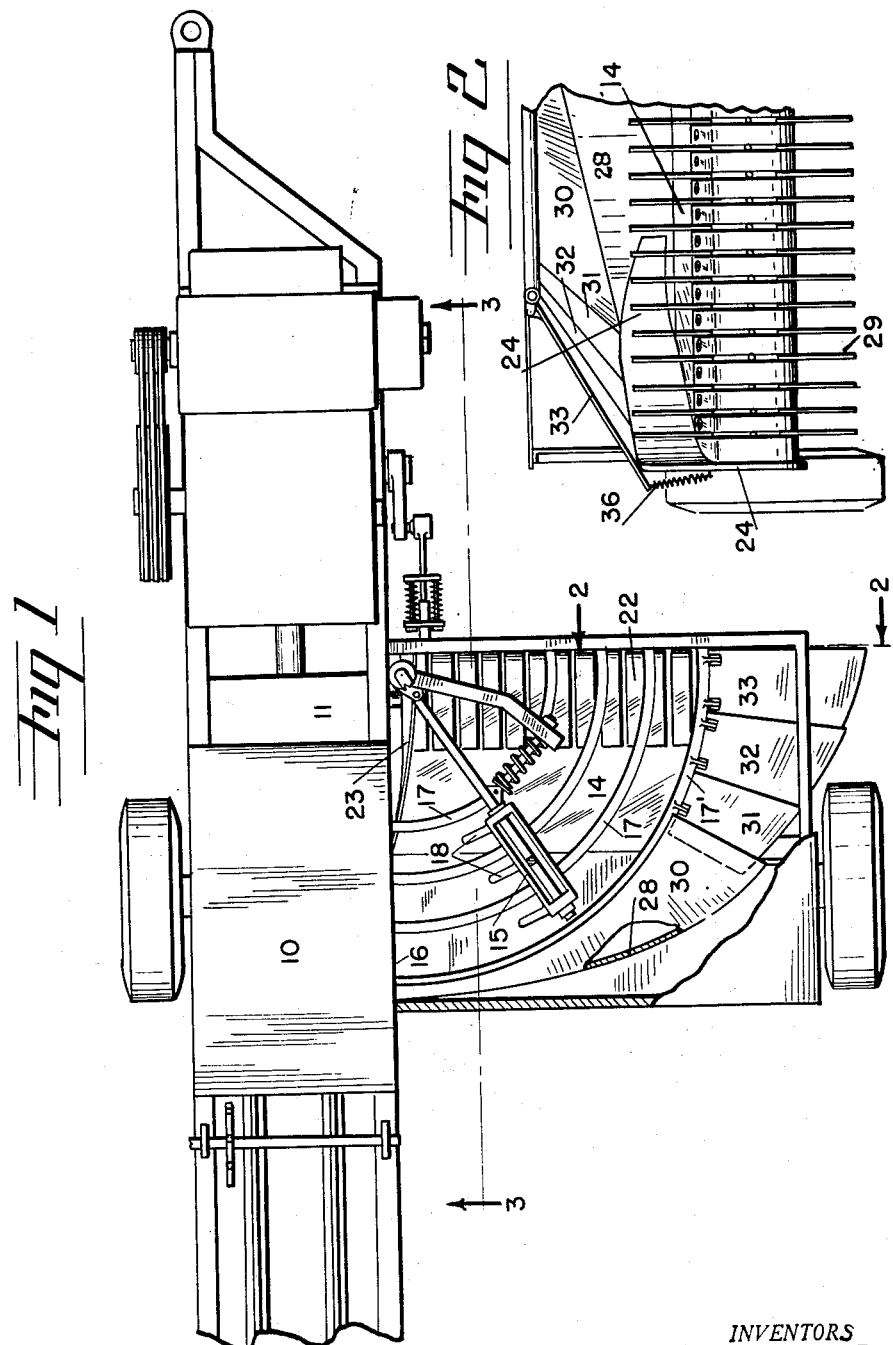

Filed Feb. 13, 1951   3 Sheets-Sheet 2

INVENTORS
PERCY F. FREEMAN JR.
JOHN M FREEMAN
BY
ATTORNEY

INVENTORS
PERCY F. FREEMAN JR.
BY JOHN M. FREEMAN

ATTORNEY

Patented Feb. 10, 1953

2,627,714

UNITED STATES PATENT OFFICE 2,627,714

HAY BALER

Percy F. Freeman, Jr., and John M. Freeman, Portland, Oreg.

Application February 13, 1951, Serial No. 210,708

4 Claims. (Cl. 56—341)

This invention relates in general to hay baling machines and, more particularly, to the modern types of portable hay balers which combine means for picking up the hay from the ground, means for moving the picked-up hay into the baling chamber, means for compressing the hay in the baling chamber, and means for binding the compressed hay into bales.

Specifically this invention relates to hay balers in which the means for moving the picked-up hay into the hay baling chamber consists of a hay sweeping mechanism, swinging laterally through approximately a 90° arc in synchronism with the operation of the plunger or compressor in the baling chamber, for example, a sweeping device such as that described in U. S. Patent No. 2,487,938 issued under date of November 15, 1949, to B. L. Nikkel, entitled "Feeder for Hay Baler."

One of the problems in operating hay balers of this general type, in which the means for picking up the hay from the ground operates continuously, is to have all the picked-up hay properly delivered into the baling chamber. In the operation of such a hay baler, as the hay baler is moved over the field, the amount of hay picked up during any given moment will of course depend upon the amount of available hay on the ground at the momentary location and also the speed at which the hay baler is moved. There may be times in which the hay is momentarily picked up more rapidly than it can be moved into the baling chamber and taken care of in the baling chamber. Under such circumstances heretofore it has not been unusual for excess hay to be spilled from a baler before it can be delivered into the baling chamber, or else for the excess hay to become packed or congested and forced out of the range of the means provided for moving the picked-up hay into the baling chamber.

An object of the present invention is to provide an improved hay baler of the type above indicated which will accommodate itself to a temporary and moderate excess amount of hay picked up from the ground without spilling the excess hay and without failing to have the same properly delivered into the baling chamber.

Another object of the invention is to provide an improved hay baler in which a maximum amount of hay can be handled without waste provided the operator exercises nominal care in controlling the speed with which the baler is moved over the ground.

A further object of the invention is to provide a hay baler with a partially closed receiving chamber for the picked-up hay on the way to the baling chamber and with means enabling such receiving chamber to be self-adjusting for variations in position of the hay pick-up means and also for variations in the amount of picked-up hay.

An additional object of the invention is to provide certain improvement in a baler of the type previously indicated which will enable the baler to operate more effectively and efficiently, but which improvement will be simple and practical and comparatively negligible in cost.

The nature of such improvement which comprises the present invention and the manner in which the invention accomplishes the objects above indicated will be briefly explained with reference to the accompanying drawings in which:

Fig. 1 is a fragmentary top plan view of a hay baler of the type previously mentioned, showing in particular the hay receiving chamber embodying the present invention;

Fig. 2 is a fragmentary front elevation of the hay receiving chamber taken on line 2—2 of Fig. 1;

Figure 3:
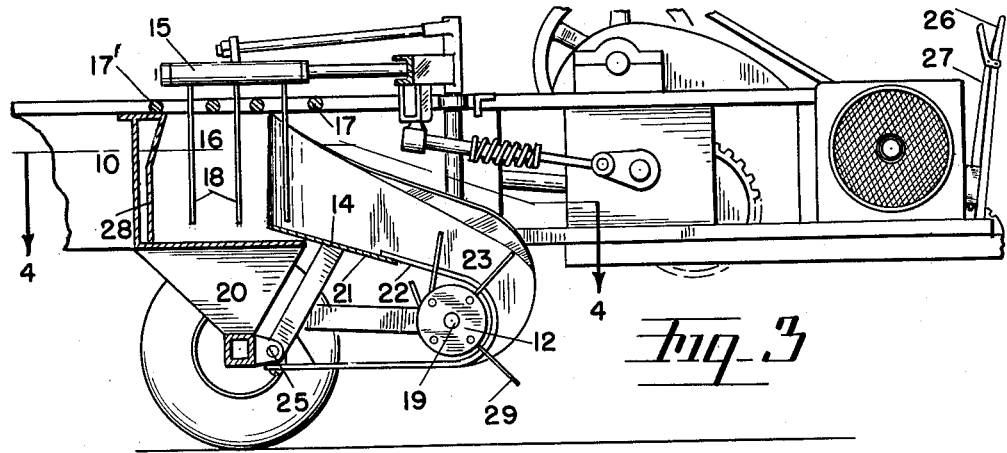
Fig. 3 is a partial side elevation and sectional side elevation on line 2—3 of Fig. 1, drawn to a slightly smaller scale and showing the hay sweeping arm assembly at the end of its inward stroke.
Figure 4:
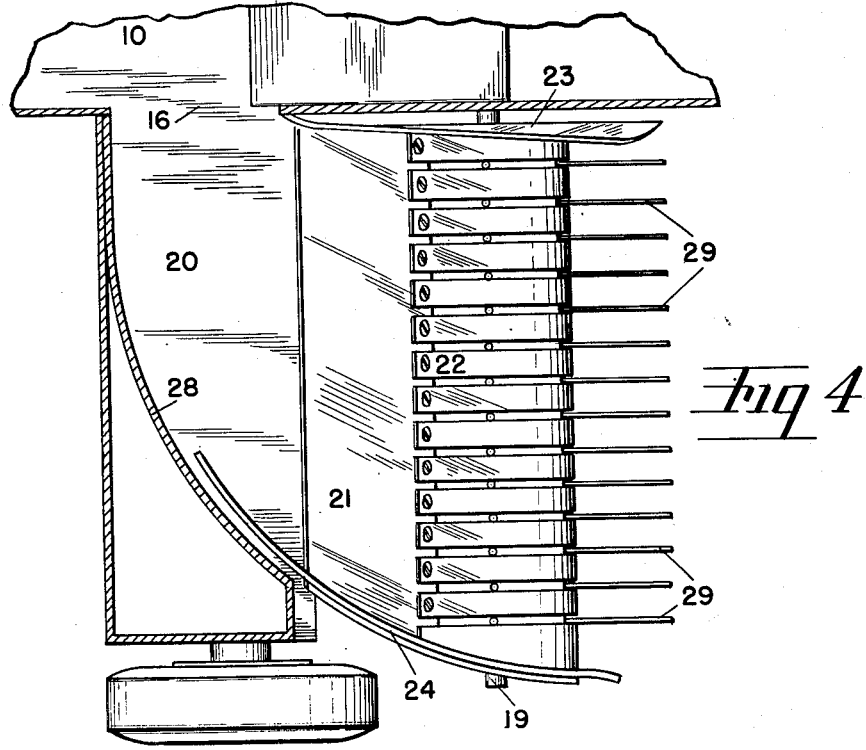
Figure 5:
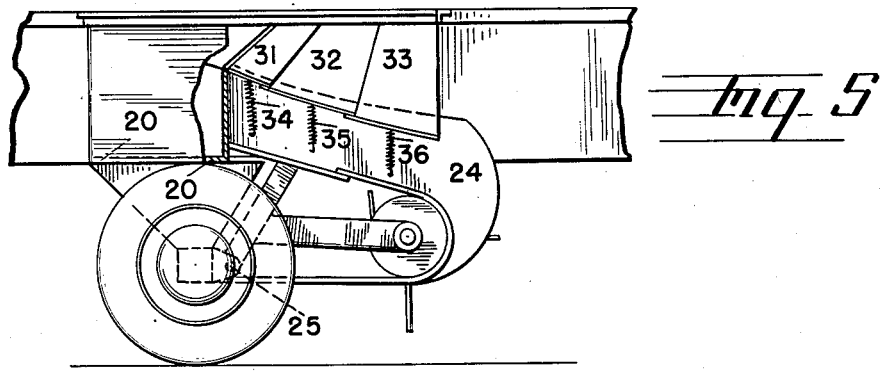
Figure 6:
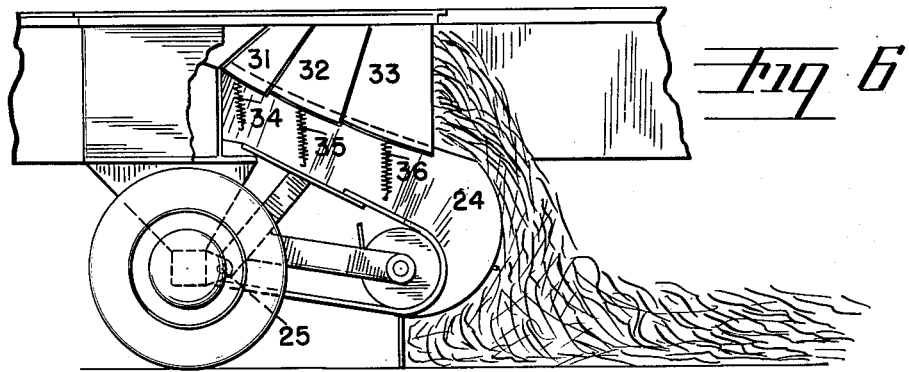
Figure 7:
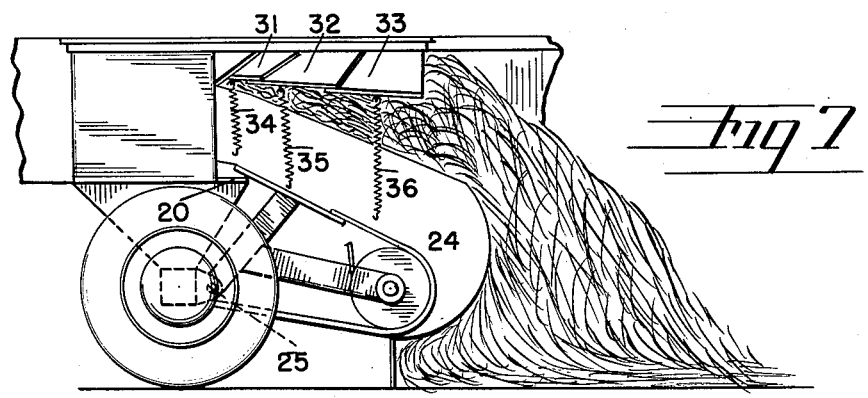

Fig. 4 is an enlarged sectional plan of the hay receiving chamber, the figure being taken on the line indicated at 4—4 in Fig. 3; and Figs. 5, 6 and 7 are side elevations of the hay receiving chamber and associated members showing the hay receiving chamber in raised position, in lowered position receiving the normal amount of hay from the hay picked up means, and in lowered position receiving an excessive amount of hay, respectively.

Referring first to Figs. 1 and 3, the hay baler illustrated is, for the most part, a well known type of baler, having a hay baling chamber 10 within which a reciprocating plunger 11 operates; a rotary hay pick-up device, indicated in general by the reference chamber 12 in Fig. 3 and extending laterally; a hay receiving chamber 14 for receiving the hay as it is picked up from the ground; and a hay sweeping arm assembly, indicated in general by the reference character 15, for moving the hay from the hay receiving chamber 14 into the baling chamber 10 through the baling chamber entrance 16.

The hay sweeping arm assembly 15 operates in synchronism with the plunger 11 of the baling chamber so that as the plunger moves forward, preparatory to each compression stroke, while opening the entrance 16 into the baling chamber, the sweeping arm assembly, swinging clockwise (as viewed in Fig. 1) through an arc of approximately 90°, will push the hay, in the hay receiving chamber 14, which collects in its path, into the baling chamber through the entrance 16.

The sweeping arm assembly rides above a plurality of curved horizontal spaced stationary rods 17 at the top of the hay receiving chamber 14, and the sweeping arm assembly carries hinged fingers 18 as usual which are so mounted that the fingers will ride over the hay in the receiving chamber in the return counterclockwise stroke of the sweeping arm assembly (as viewed in Fig. 1), but will push the hay ahead of them in their path during the clockwise or hay-moving stroke of the arm assembly.

The rotary hay pick-up device 12 is an assembly including a driven horizontal shaft 19 and spaced radial fingers 29. The shaft 19 is supported at its ends in frame members which are hinged for up and down movement so that the entire assembly or pick-up device may be raised or lowered with respect to the ground in the customary manner. The hay receiving chamber 14 has a composite platform or bottom including a rear stationary horizontal portion 20 (Figs. 3 and 4) and an inclined movable portion comprising a main plate 21 and a plurality of curved strips 22 secured to the forward edge of the plate 21 and extending down over and under the rotary pick-up device, the space between the strips forming slots for the moving fingers 29 of the pick-up device.

The movable bottom main plate 21, together with an inner side wall plate 23 (Figs. 3 and 4), and an outer side wall plate 24, which constitutes the movable front portion of the hay receiving chamber are rigidly secured to the hinged frame construction in which the pick-up device is rotatably mounted, and which entire frame construction is movable up and down on a horizontal hinge axis parallel to the wheel axle of the baler and indicated at 25 in Fig. 3. The raising or lowering of this entire hinged frame construction is done manually by a simple and suitable lever system (not shown), controlled by a positioning arm 26 (Fig. 3) equipped with the usual spring actuated pawl 27 adapted to engage the teeth of a rigidly mounted quadrant. Thus by manipulating the positioning arm 26 the operator can set the entire hinged frame, including the rotary pick-up device, in a raised position, such as that shown in Figs. 3 and 5, or in a lowered position, such as that illustrated in Fig. 6, in which the fingers 29 of the pick-up device will function to engage the hay on the ground and lift it up and thrust it into the hay receiving chamber 14.

A curved stationary back wall 28 (Figs. 1, 3 and 4) is rigidly mounted above the stationary platform portion 20. This stationary back wall 28 increases in height from its outer end inwardly until, about midway between its outer and its inner end, its height reaches the level of the curved horizontal rods 17 or the top of the hay receiving chamber 14 and continues at this maximum height to the entrance 16 to the hay baling chamber. A curved inclined rear cover plate 30 (Fig. 1) has its top edge secured to the outermost curved horizontal rod 17' and its bottom edge secured to the part of the top edge of the back wall 28 until the back wall reaches its maximum height.

The rear portion of the outer side wall plate 24 of the hay receiving chamber 14 overlaps part of the stationary back wall 28 of the chamber, as shown in Fig. 2, and its curvature conforms to the curvature of the overlapped back wall. However, the rear overlapping portion of the wall 24 decreases in height so that this portion of the wall 24 will not engage the rear cover plate 30 when the front part of the hay receiving chamber and the hinged frame construction on which it is supported are swung down to the lowered position illustrated in Fig. 6.

Three separate cover plate sections 31, 32 and 33 (Figs. 1, 2, 5, 6 and 7), are hinged in consecutive order to the outermost curved top rod 17' beyond the front end of the stationary cover plate 30. These hinged cover plate sections normally rest on the top edge of the outer side wall plate 24 and extend a short distance out beyond the same, as shown most clearly in Figs. 5 and 6. They overlap each other at their front edges consecutively, and similarly the front edge of the stationary cover plate 30 overlaps the rear edge of the rearmost hinged section 31. These hinged cover plate sections 31, 32, 33 are of increasing length so as to span the spacing between the top rod 17' and the top edge of the outer side wall plate 24, which spacing increases towards the front of the hay receiving chamber. Coil springs 34, 35 and 36 (Figs. 5 and 6) have their upper ends attached to the outer edges of the hinged cover plate sections 31, 32 and 33 respectively and their lower ends attached on the outer face of the side wall plate 24 as shown. The purpose of the coil springs 34, 35 and 36 is to keep these cover plate sections normally held down against the top edge of the side wall plate 24, thus forming a partial top closure for the side portion of the hay receiving chamber, and normally these coil springs will hold their cover plate sections down against the top edge of the side wall plate 24 whether the hinged frame and the front part of the hay receiving chamber are in the raised position of Fig. 5 or in the lowered position of Fig. 6.

The hay sweeping arm assembly 15, as apparent from Fig. 1, is adapted to move the hay in an arcuate path. The width of this path in which the hay sweeping means moves corresponds approximately to the width of the entrance opening 16 into the hay baling chamber 10. Thus the hay sweeping means, comprising the hinged fingers 18 of the assembly, extend over only a limited area approximately the same width as the entrance opening 16.

However, the width of the hay receiving chamber 14 at the front is considerably greater than the width of the entrance 16 into the baling chamber and thus considerably greater than the width of the path in which the hay sweeping means moves. We have found that, for maximum efficiency, the width of the hay receiving chamber at the front, and also the length of the rotating hay pick-up device, should be preferably from three to four times the width of the entrance 16 into the hay baling chamber, while the width of the entrance 16 corresponds to the length or stroke of the reciprocating plunger in the baling chamber. We have also found that, as indicated in Fig. 1, the path of the hay sweeping means should be more or less centrally positioned in the front of the hay receiving chamber. With such arrangement the hay delivered at the front of the hay receiving chamber by the rotating hay pick-up device will be delivered directly into the path of the hay sweeping means and also delivered equally on both sides of this path at the front of the hay receiving chamber. The rotating pick-up device, acting to push the picked-up hay into the receiving chamber will also cause the hay on both sides of the arcuate path of the hay sweeping means to be pushed into the path. Thus it will be apparent from Fig. 1 that the hay delivered into the hay receiving chamber beneath the path of the sweeping means and the inner side wall 23 will be thrust back and into the arcuate path of the sweeping means, while the hay received at the opposite side of the hay receiving chamber and thus between the path of the sweeping means and the outer side wall 24, will also eventually be pushed into the path of the hay sweeping means further towards the back of the hay receiving chamber, as it is pushed along the curved side wall 24 and the curved rear wall 28.

When the amount of hay delivered into the hay receiving chamber by the pick-up device momentarily exceeds the amount which can be taken care of by the hay sweeping assembly and the baling chamber, there will be a tendency for an excess of the pick-up hay to appear in that portion of the hay receiving chamber which is between the outer side wall 24 and the path of the hay sweeping means since the hay in the opposite side of the receiving chamber adjacent the inner side wall 23, travels a shorter distance to come into the path of the hay sweeping means and is thus picked up by the sweeping means more quickly. If the amount of the excess hay in this outer portion of the hay receiving chamber, inside the outer side wall 24, increases, the hinged cover plate sections 31, 32 and 33 will be pushed upwardly against the force of their coil springs 34, 35, 36, thus temporarily enlarging the capacity of this portion of the hay receiving chamber. The hinged cover plate sections and their coil springs will also, to a certain extent, act to compact the excess hay in this portion of the chamber, and, unless the amount of excess hay is allowed to build up unduly, the cover plate sections will prevent the excess hay from spilling out over the top of the side wall 24.

In Fig. 6, in which as previously mentioned, the hinged frame construction, including the movable portion of the hay receiving chamber and the hay pick-up device, is shown in lowered operating position, the rate at which the hay is being picked up from the ground is not exceeding the rate at which it can be taken care of by the hay sweeping means and the baling chamber. In Fig. 7, however, the rate at which the hay is picked up from the ground is assumed to be momentarily exceeding the rate at which the hay is being moved out of the hay receiving chamber. Consequently a considerable excess of hay is shown in this figure collecting in the hay receiving chamber and the hinged cover plate sections 31, 32, and 33 have been pushed upwardly against the force of their coil springs by the accumulating excess hay. In this raised position, however, the hinged cover plate sections will still keep the accumulated and compacted hay from spilling out over the side wall 24, provided of course the accumulation of hay is not allowed to increase too much. The operator of the hay baler, noting that the hinged cover plate sections are being raised, will then temporarily reduce the speed at which the baler is being moved over the ground, unless the hay baler is approaching a portion of the field in which there is a reduced amount of hay to be picked up, but without reducing the rate at which the hay sweeping assembly and compressor in the baling chamber are operating, and in this way the excess hay in the hay receiving chamber is soon taken care of.

Thus, unless the operator is careless enough to pay no attention whatsoever to the operation of the baler, there will be no waste of hay and no difficulty encountered, even though from time to time, the hay is picked up from the ground momentarily faster than it can be baled. While the excess hay, which is held temporarily in the hay receiving chamber along the outer side wall 24 and rear wall 28 may become somewhat compacted, it can not be congested or forced out of range of the hay sweeping means. On the contrary, due to the arrangement of the curved side wall 24, curved rear wall 28, inclined rear cover plate 30, and the spring-controlled, inclined and overlapping cover plates 31, 32 and 33, all the hay in this portion of the hay receiving chamber must ultimately move into the path of the hay sweeping means and be delivered into the hay baling chamber.

In the hay baler which we have illustrated and described as embodying our invention, various changes could be made, and also minor modifications would be possible in the construction of the hay receiving chamber, without departing from the principle of our invention, and it is not our intention to limit our invention except as the same is defined in the claims.

We claim:

1. In a baler including a main frame and a baling chamber with an entrance opening into the side of the baling chamber, a rotary pick-up device extending laterally with respect to said main frame, a hay receiving chamber located above said pick-up device and leading from said pick-up device to said entrance opening, a curved back wall in said hay receiving chamber, an inner side wall and an outer side wall in said hay receiving chamber, said outer side wall being curved and partly overlapping said back wall, hay sweeping means in said hay receiving chamber, said sweeping means moving in an arcuate path extending from the front of said hay receiving chamber to said entrance opening, the width of said path being approximately equal to the width of said entrance opening, the front width of said hay receiving chamber being considerably greater than said path and said path being positioned a substantial distance from said outer side wall in said hay receiving chamber at the front, a member at the top of said hay receiving chamber located above said path, and a plurality of successive cover plate sections hinged to said member, said cover sections extending outwardly from the forward portion of said member to the top edge of said outer side wall and normally resting on the top of said wall.

2. In a baler of the character described, a main frame and a baling chamber with an entrance opening into the side of the baling chamber, a rotary pick-up device extending laterally with respect to said main frame, a hay receiving chamber located above said pick-up device and leading from said pick-up device to said entrance opening, a hinged frame in said main frame, means for raising and lowering said hinged frame, said pick-up device mounted in said hinged frame, said hay receiving chamber having a rear portion and a front portion, said front portion supported on said hinged frame, a stationary curved back wall in said rear portion of said hay receiving chamber, an inner side wall and an outer side wall in said front portion of said hay receiving chamber, said outer side wall being curved and partly overlapping said stationary back wall, hay sweeping means in said hay receiving chamber, said sweeping means moving in an arcuate path extending from the front of said hay receiving chamber to said entrance opening, the width of said path being approximately equal to the width of said entrance opening, the front width of said hay receiving chamber being considerably greater than said path and said path being centrally positioned in said hay receiving chamber at the front, a stationary member at the top of said hay receiving chamber located above said path, and a plurality of successive cover plate sections hinged to said member, said cover sections extending outwardly and downwardly from the forward portion of said member over and beyond the top of said outer side wall, said cover sections normally resting on said outer side wall and being of sufficient length to rest on said side wall when said front portion of said hay receiving chamber is in lowered position.

3. In a portable hay baler including a main frame and a baling chamber with an entrance opening into the side of the baling chamber, a rotary pick-up device extending laterally with respect to said main frame, a hay receiving chamber located above said pick-up device and leading from said pick-up device to said entrance opening, a curved back wall in said hay receiving chamber, an inner side wall and an outer side wall in said hay receiving chamber, said outer side wall being curved and partly overlapping said back wall, hay sweeping means in said hay receiving chamber, said sweeping means moving in an arcuate path extending from the front of said hay receiving chamber to said entrance opening, the width of said path being approximately equal to the width of said entrance opening, the front width of said hay receiving chamber being at least three times the width of said path and said path being centrally positioned in said hay receiving chamber at the front, a curved rod at the top of said hay receiving chamber located above the outer border of said path, a plurality of successive cover plate sections extending from the forward portion of said rod to the top edge of said outer side wall, said sections hinged to said rod, and means normally holding said sections down against the top edge of said outer side wall but so arranged as to permit said sections temporarily to be raised above said side wall when an excess of hay accumulates in said hay receiving chamber.

4. In a portable hay baler of the character described, a main frame and a baling chamber with an entrance opening into the side of the baling chamber, a rotary pick-up device extending laterally with respect to said main frame, a hay receiving chamber located above said pick-up device and leading from said pick-up device to said entrance opening, a hinged frame in said main frame, means for raising and lowering said hinged frame, said pick-up device mounted in said hinged frame, said hay receiving chamber having a rear portion and a front portion, said front portion supported on said hinged frame, a curved stationary back wall in said rear portion of said hay receiving chamber, an inner side wall and an outer side wall in said front portion of said hay receiving chamber, said outer side wall being curved and partly overlapping said stationary back wall, hay sweeping means in said hay receiving chamber, said sweeping means moving in an arcuate path extending from the front of said hay receiving chamber to said entrance opening, the width of said path being approximately equal to the width of said entrance opening, the front width of said hay receiving chamber being considerably greater than said path and said path being positioned a substantial distance from said outer side wall in said hay receiving chamber at the front, a stationary curved horizontal rod at the top of said hay receiving chamber located above the outer border of said path, a plurality of successive cover plate sections extending from the forward portion of said rod to the top edge of said outer side wall, said sections hinged to said rod, said sections overlapping each other at their front edges consecutively, said sections being of sufficient length to extend from said rod to said outer side wall even when said front portion of said hay receiving chamber is in maximum lowered position, and spring means normally holding said sections down against the top edge of said outer side wall but permitting said sections temporarily to be raised above said side wall when an excess of hay accumulates in said hay receiving chamber.

PERCY F. FREEMAN, Jr.
JOHN M. FREEMAN.

REFERENCES CITED

The following references are of record in the file of this patent:

UNITED STATES PATENTS

| Number | Name | Date |
|---|---|---|
| 2,362,861 | Russell | Nov. 14, 1944 |
| 2,430,734 | Raney | Nov. 11, 1947 |
| 2,487,938 | Nikkel | Nov. 15, 1949 |